US010762323B2

(12) United States Patent
Ding et al.

(10) Patent No.: US 10,762,323 B2
(45) Date of Patent: Sep. 1, 2020

(54) FINGERPRINT RECOGNITION APPARATUS AND METHOD FOR READING SIGNALS THEREOF, DISPLAY APPARATUS

(71) Applicant: BOE TECHNOLOGY GROUP CO., LTD., Beijing (CN)

(72) Inventors: Xiaoliang Ding, Beijing (CN); Xue Dong, Beijing (CN); Jing Lv, Beijing (CN); Haisheng Wang, Beijing (CN); Chunwei Wu, Beijing (CN); Yingming Liu, Beijing (CN); Wei Liu, Beijing (CN); Pengpeng Wang, Beijing (CN); Yanling Han, Beijing (CN); Xueyou Cao, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/307,912

(22) PCT Filed: Feb. 13, 2018

(86) PCT No.: PCT/CN2018/076654
§ 371 (c)(1),
(2) Date: Dec. 6, 2018

(87) PCT Pub. No.: WO2018/161792
PCT Pub. Date: Sep. 13, 2018

(65) Prior Publication Data
US 2019/0220645 A1     Jul. 18, 2019

(30) Foreign Application Priority Data
Mar. 7, 2017 (CN) .......................... 2017 1 0134131

(51) Int. Cl.
*G06K 9/00* (2006.01)
*G09G 3/3225* (2016.01)
*G09G 3/3266* (2016.01)

(52) U.S. Cl.
CPC ......... *G06K 9/0004* (2013.01); *G06K 9/0002* (2013.01); *G09G 3/3225* (2013.01);
(Continued)

(58) Field of Classification Search
CPC ........................... G06K 9/0002; G06F 3/0421
(Continued)

(56) References Cited

U.S. PATENT DOCUMENTS

2013/0069537 A1   3/2013   Sun et al.
2015/0331508 A1*   11/2015   Nho ..................... G06F 3/0421
                                                          345/173
(Continued)

FOREIGN PATENT DOCUMENTS

CN      104155785 A     11/2014
CN      106157890 A     11/2016
(Continued)

OTHER PUBLICATIONS

International Search Report and Written Opinion of the International Searching Authority issued in corresponding International Application No. PCT/CN2018/076654, dated May 8, 2018, with English translation.

*Primary Examiner* — Abdul-Samad A Adediran
(74) *Attorney, Agent, or Firm* — McDermott Will & Emery LLP

(57) ABSTRACT

A fingerprint recognition apparatus is provided. The fingerprint recognition apparatus includes m driving signal lines, n reading signal lines, and m*n photosensitive devices. Each of a plurality of electrode signal controllers is connected to at least two of the m driving signal lines, the plurality of
(Continued)

electrode signal controllers are configured to simultaneously input driving signals of different frequencies to each of the m driving signal lines connected to the plurality of electrode signal controllers, and a demodulator is connected to the n reading signal lines, and is configured to demodulate electrical signals of different frequencies transmitted on each of the n reading signal lines.

10 Claims, 9 Drawing Sheets

(52) U.S. Cl.
CPC ... *G09G 3/3266* (2013.01); *G09G 2300/0408* (2013.01); *G09G 2310/0286* (2013.01); *G09G 2310/08* (2013.01); *G09G 2354/00* (2013.01)

(58) Field of Classification Search
USPC .......................................................... 345/173
See application file for complete search history.

(56) References Cited

U.S. PATENT DOCUMENTS

| | | | |
|---|---|---|---|
| 2016/0042216 A1 | 2/2016 | Yang et al. | |
| 2018/0204037 A1* | 7/2018 | Hargreaves | G06K 9/0002 |
| 2018/0365473 A1 | 12/2018 | Wang et al. | |

FOREIGN PATENT DOCUMENTS

| | | |
|---|---|---|
| CN | 106326859 A | 1/2017 |
| CN | 106919927 A | 7/2017 |

* cited by examiner

FINGERPRINT RECOGNITION APPARATUS AND METHOD FOR READING SIGNALS THEREOF, DISPLAY APPARATUS

CROSS-REFERENCE TO RELATED APPLICATION

This application is the National Stage Application of International Application No. PCT/CN2018/076654 filed on Feb. 13, 2018, which claims priority to Chinese Patent Application No. 201710134131.2, filed on Mar. 7, 2017, titled "A FINGERPRINT RECOGNITION APPARATUS AND METHOD FOR READING SIGNALS THEREOF, DISPLAY APPARATUS", which are both incorporated herein by reference in its entirety.

TECHNICAL FIELD

The present disclosure relates to the field of fingerprint recognition, and more particularly to a fingerprint recognition apparatus and a method for reading signals thereof, and a display apparatus.

BACKGROUND

In recent years, with the rapid development of technology, mobile products with biometric recognition functions have gradually come into people's life and work, and fingerprint technology has received much attention owing to the unique identity of fingerprint.

In related art, light of different intensities can be converted into photocurrents of different magnitudes using photosensitive devices. Thus, owing to the difference between valleys and ridges of the fingerprint, reflected light of different intensities can be generated when a finger is irradiated by a light source. Thereby different photocurrents can be generated. On this basis, fingerprint patterns can be obtained.

SUMMARY

An aspect of embodiments of the present disclosure provides a fingerprint recognition apparatus, including: m driving signal lines, n reading signal lines and m*n photosensitive devices. The m driving signal lines and the n reading signal lines are arranged crosswise, the m*n photosensitive devices are arranged in a matrix form, and each of the m*n photosensitive devices includes a first electrode and a second electrode, m and n both being positive integers. First electrodes of a same row of photosensitive devices in the m*n photosensitive devices are connected to a same driving signal line of the m driving signal lines, the m driving signal lines are configured to input a first driving signal to the m*n photosensitive devices, first electrodes of different rows of photosensitive devices in the m*n photosensitive devices are connected with different driving signal lines of the m driving signal lines. The second electrode is configured to input a second driving signal. First electrodes of a same column of photosensitive devices in the m*n photosensitive devices are connected to a same reading signal line of the n reading signal lines, first electrodes of different columns of photosensitive devices in the m*n photosensitive devices are connected to different reading signal lines of the n reading signal lines. The fingerprint recognition apparatus further includes: a plurality of electrode signal controllers, each of the plurality of electrode signal controllers is connected to at least two driving signal lines of the m driving signal lines, different electrode signal controllers of the plurality of electrode signal controllers are connected to different driving signal lines of the m driving signal lines, the plurality of electrode signal controllers are configured to simultaneously input driving signals of different frequencies to each driving signal line of the m driving signal lines connected to the plurality of electrode signal controllers, different electrode signal controllers of the plurality of electrode signal controllers are configured to input driving signals to the m driving signal lines at different time periods; a demodulator connected to the n reading signal lines, wherein the demodulator is configured to demodulate electrical signals of different frequencies transmitted on each of the n reading signal lines when the plurality of electrode signal controllers drive each row of photosensitive devices in the m*n photosensitive devices connected to the plurality of electrode signal controllers.

Optionally, the number of the plurality of the electrode signal controllers is S, the fingerprint recognition apparatus further includes S signal control lines, m/S signal input lines, and each of the m/S signal input lines is configured to input driving signals of different frequencies. Each of the plurality of electrode signal controllers is connected to one of the S signal control lines, the m/S signal input lines and m/S driving signal lines in the m driving signal lines, and is configured to output driving signals input by each of the m/S signal input lines to each of the m/S driving signal lines in the m driving signal lines in a manner of one-to-one correspondence under control of one of the S signal control lines.

Optionally, each of the plurality of electrode signal controllers includes m/S sub-controllers, the m/S sub-controllers are all connected to a same signal control line of the S signal control lines, and are connected to the m/S signal input lines in a manner of one-to-one correspondence, and are connected to the m/S driving signal lines in the m driving signal lines in a manner of one-to-one correspondence; the m/S sub-controllers are configured to output driving signals input by the m/S signal input lines to the m/S driving signal lines in the m driving signal lines under control of the S signal control lines.

Optionally, each of the m/S sub-controllers is a thin film transistor, a gate electrode of the thin film transistor is connected with one of the S signal control lines, a source electrode is connected with one of the m/S signal input lines, and a drain electrode is connected with one of m/S driving signal lines in the m driving signal lines.

Optionally, S-1 driving signal lines of the M/S driving signal lines are arranged between every two adjacent driving signal lines within m/S driving signal lines which are connected to a same electrode signal controller of the plurality of electrode signal controllers; and/or S sub-controllers of the plurality of electrode signal controllers connected to adjacent S driving signal lines of the m driving signal lines are connected to a same signal input line of the m/S signal input lines.

Optionally, the number of the demodulators is more than one; each of the n reading signal lines is connected to one of the demodulators; or each of the n reading signal lines is connected to at least two of the demodulators; or each of the plurality of demodulators is connected to each of the n reading signal lines via a switcher.

Optionally, second electrodes of the m*n photosensitive devices are connected together.

Another aspect of embodiments of the present disclosure further provides a display apparatus, including the fingerprint recognition apparatus above.

Optionally, the display apparatus is an organic light emitting display apparatus, and is divided into a plurality of pixel units, and each of the plurality of pixel units includes a first primary color sub-pixel, a second primary color sub-pixel, a third primary color sub-pixel and a photosensitive device.

Optionally, the display apparatus further includes a light-emitting control shift register circuit, the light-emitting control shift register circuit includes a plurality of light-emitting control shift register units, each of the plurality of light-emitting control shift register units includes a pull-down controller and a pull-down device; the pull-down controller is connected to a clock signal input end, a pull-down node, and a first low level input end, and is configured to transmit a signal of the first low level input end to the pull-down node under control of the clock signal input end; the pull-down device is connected to the pull-down node, a second low level input end, and a light-emitting control signal output end, and is configured to transmit a signal of the second low level input end to the light-emitting control signal output end under control of the pull-down node; the light-emitting control signal output end is connected to a driving signal line, and the driving signal line shares a same line with a light-emitting control line of a same row of sub-pixels, a sub-controller is connected to the second low level input end, and outputs a driving signal input by a signal input line to the driving signal line via the second low level input end.

Another aspect of embodiments of the present disclosure further provides a method for reading signals of a fingerprint recognition apparatus. The fingerprint recognition apparatus includes: m driving signal lines, n reading signal lines and m*n photosensitive devices, wherein the m driving signal lines and the n reading signal lines are arranged crosswise, the m*n photosensitive devices are arranged in a matrix form, and each of the m*n photosensitive devices includes a first electrode and a second electrode, m and n both being positive integers. First electrodes of a same row of photosensitive devices of the m*n photosensitive devices are connected to a same driving signal line of the m driving signal lines, the m driving signal lines are configured to input a first driving signal to the m*n photosensitive devices, first electrodes of different rows of photosensitive devices in the m*n photosensitive devices are connected with different driving signal lines of the m driving signal lines, the second electrode is configured to input a second driving signal, first electrodes of a same column of photosensitive devices in the m*n photosensitive devices are connected to a same reading signal line of the n reading signal lines, first electrodes of different columns of photosensitive devices in the m*n photosensitive devices are connected to different reading signal lines of the n reading signal lines. The fingerprint recognition apparatus further includes a demodulator connected to the n reading signal lines, the demodulator is configured to demodulate electrical signals of different frequencies transmitted on each of the n reading signal lines. The method for reading signals includes: inputting driving signals to different signal line groups in different time periods, including: inputting driving signal of different frequencies to each of the m driving signal lines in a signal line group within a time period, the signal line group including at least two of the m driving signal lines; demodulating signals of each of the n reading signal lines for each of the time periods to demodulate electrical signals of different frequencies transmitted on each of the n reading signal lines.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

FIG. 9b is a signal timing diagram of FIG. 9a; and

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
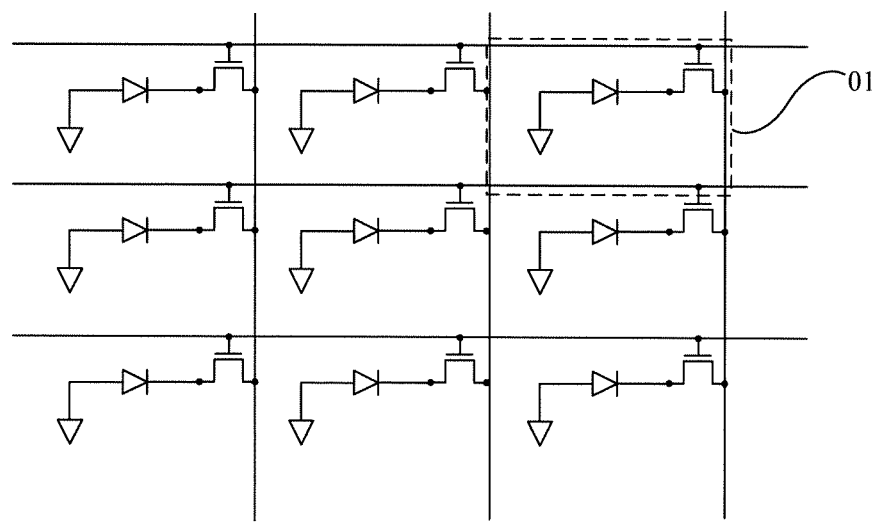
FIG. 1 is a schematic structural diagram of an exemplary fingerprint recognition apparatus.

FIG. 1 shows an example of a fingerprint recognition apparatus. As shown in FIG. 1, each of sensors 01 consists of a photosensitive diode and a thin film transistor (TFT). When a fingerprint is detected, photosensitive devices are switched on under control of the thin film transistor by switching on gate lines sequentially line by line. And currents of each of the photosensitive devices are read successively. Thus, patterns of the valleys and ridges of the fingerprint can be detected based on the differences among the photosensitive devices.

However, the above method for obtaining fingerprint patterns by driving the gate lines line by line results in a long fingerprint detection time and a slow response.

Figure 2:
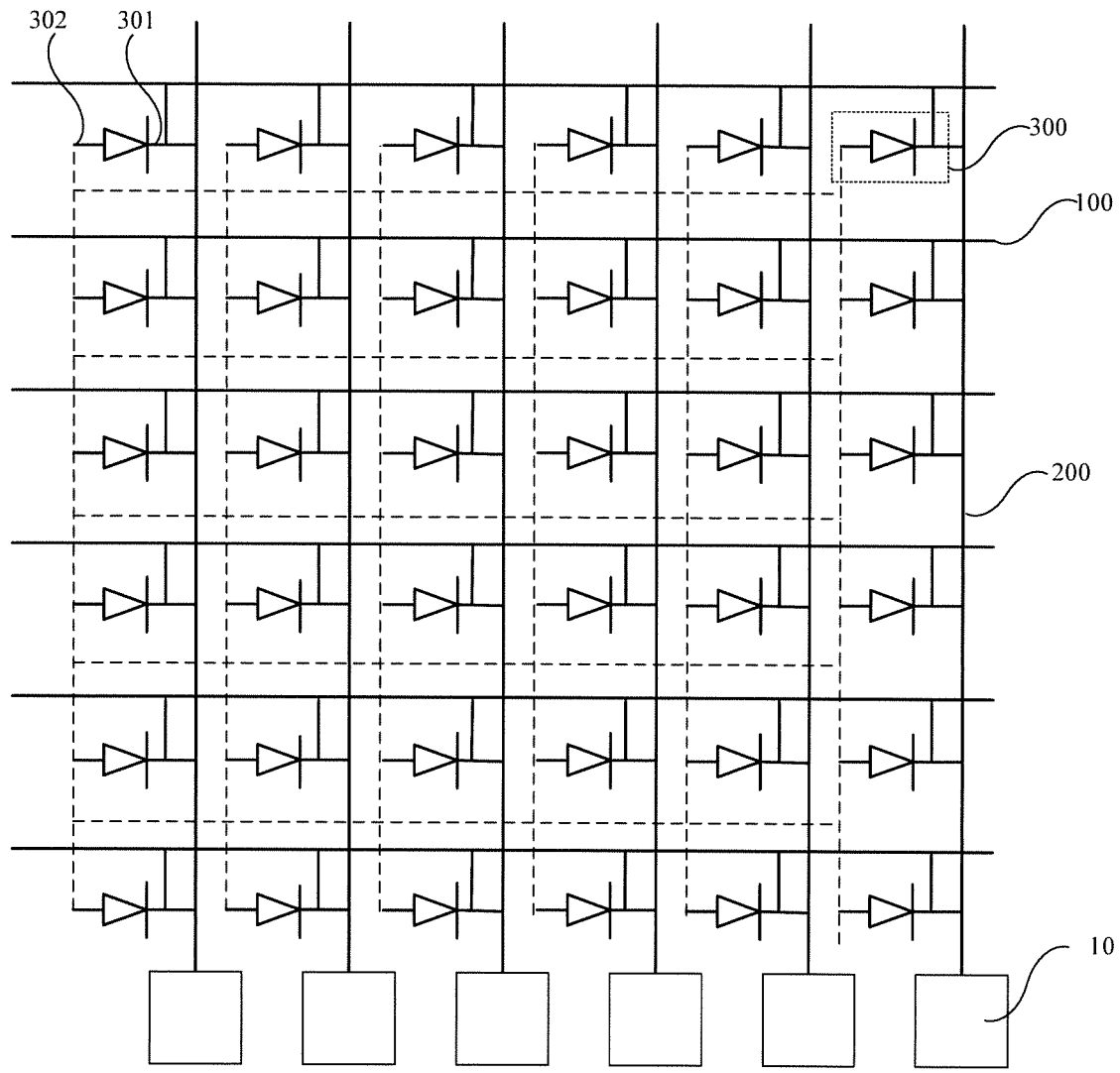
FIG. 2 is a schematic structural diagram of a fingerprint recognition apparatus according to embodiments of the present disclosure.

Embodiments of the present disclosure provide a fingerprint recognition apparatus. As shown in FIG. 2, the fingerprint recognition apparatus includes m driving signal lines 100, n reading signal lines 200 and m*n photosensitive devices 300, wherein the m driving signal lines 100 and the n reading signal lines 200 are arranged crosswise, and the m*n photosensitive devices 300 are arranged in a matrix form, m and n both being positive integers.

Figure 3:
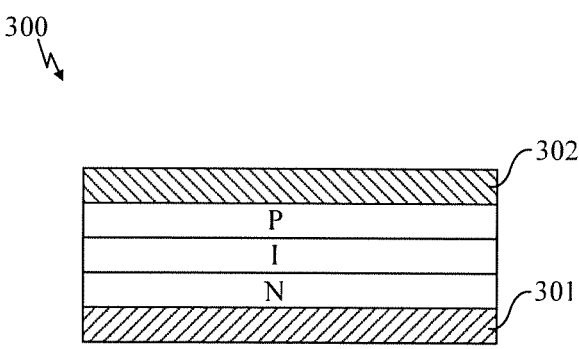
FIG. 3 is a schematic structural diagram of a photosensitive device according to embodiments of the present disclosure.

As shown in FIG. 3, each of the m*n photosensitive devices includes a first electrode 301 and a second electrode 302. Of course, each of the m*n photosensitive devices 300 further includes a photosensitive portion. For example, the photosensitive portion may be a PIN structure of a P-type semiconductor layer, an I-type intrinsic semiconductor layer (intrinsic semiconductor layer) and an N-type semiconductor layer which are sequentially arranged between the first electrode 301 and the second electrode 302. The PIN structure is connected in a reverse connection method between the first electrode 301 and the second electrode 302, that is, the voltage applied to an electrode connected to the P-type semiconductor layer is smaller than the voltage applied to an electrode connected to the N-type semiconductor layer to ensure the PIN structure at a reverse bias condition. The following embodiments are all described for the example that the first electrode 301 is connected to the N-type semiconductor layer and the second electrode 302 is connected to the P-type semiconductor layer.

As shown in FIGS. 2 and 3, the first electrodes 301 of a same row of photosensitive devices 300 in the m*n photosensitive devices 300 are connected to a same driving signal line 100 of them driving signal lines 100. Them driving signal lines 100 are configured to input a first driving signal to the m*n photosensitive devices 300. The first electrodes 301 of different rows of photosensitive devices 300 in the m*n photosensitive devices 300 are connected to different driving signal lines 100 of the m driving signal lines 100. The first electrodes 301 of a same column of photosensitive devices 300 in the m*n photosensitive devices 300 are connected to a same reading signal line 200 of the n reading signal lines 200, the first electrodes 301 of different columns of photosensitive devices 300 in the m*n photosensitive devices 300 are connected to different reading signal lines 200 of the n reading signal lines 200. The second electrode 302 is configured to input a second driving signal, and generally in order to simplify a manufacture process, all the second electrodes 302 of the m*n photosensitive devices 300 can be connected together, as shown in FIG. 2.

Figure 4:
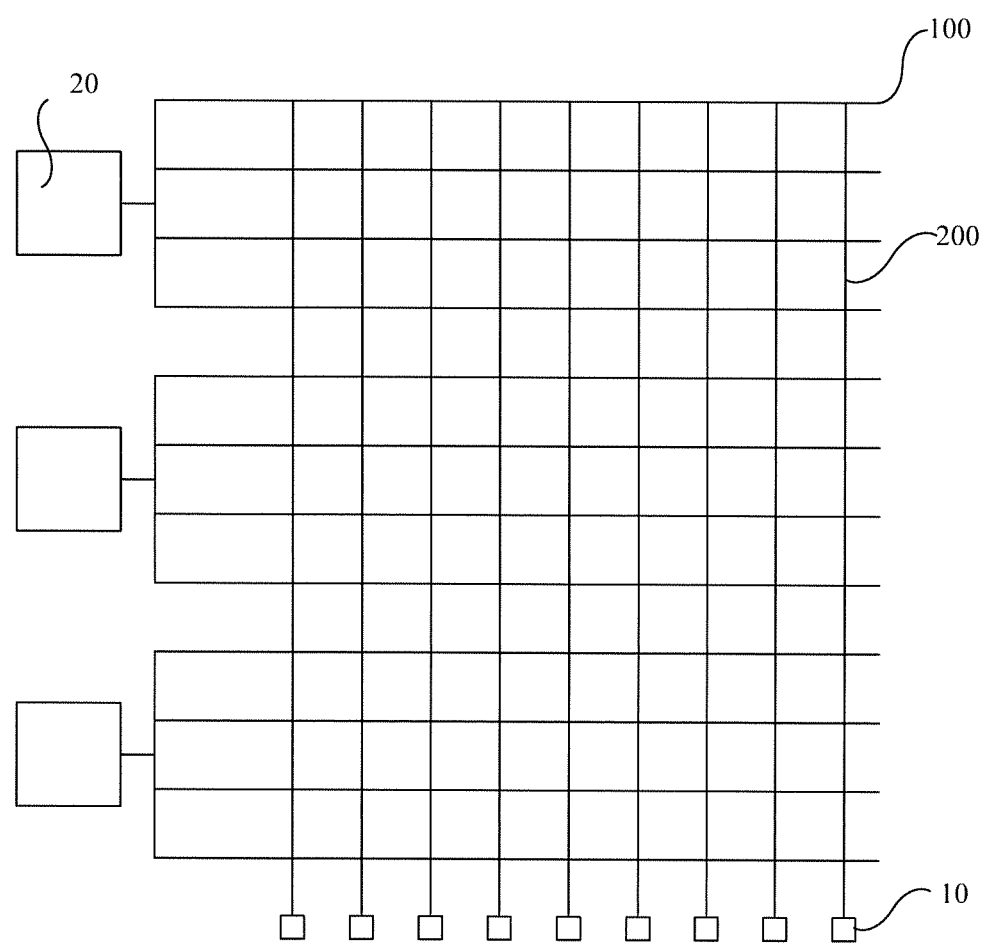
FIG. 4 is a schematic structural diagram of another fingerprint recognition apparatus according to embodiments of the present disclosure.

Furthermore, as shown in FIG. 4, the fingerprint recognition apparatus further includes a demodulator 10 and a plurality of electrode signal controllers 20. Each of the plurality of electrode signal controllers 20 is connected to at least two of the m driving signal lines 100, the different electrode signal controllers 20 of the plurality of electrode signal controllers 20 are connected to different driving signal lines 100 of the m driving signal lines 100. The plurality of electrode signal controllers 20 are configured to simultaneously input driving signals of different frequencies to each driving signal lines 100 in the m driving signal lines 100 connected to the plurality of electrode signal controllers 20, different electrode signal controllers of the plurality of electrode signal controllers 20 are configured to input driving signals to the m driving signal lines 100 at different time periods. Exemplarily, FIG. 4 is merely described for the example that each of the plurality of electrode signal controllers 20 is connected to four driving signal lines 100 of the m driving signal lines 100. In practice, the number of the driving signal lines of the m driving signal lines 100 connected to each of the plurality of electrode signal controllers 20 can be set according to actual needs, and can be the same or different, which is not limited in the present disclosure.

The demodulator 10 is connected to the n reading signal lines 200. The demodulator 10 is configured to demodulate electrical signals of different frequencies transmitted on each of the n reading signal lines 200 when the plurality of electrode signal controllers 20 drive each row of photosensitive devices 300 of the m*n photosensitive devices 300 connected to the plurality of electrode signal controllers 20.

It should be noted here that demodulation executed by the demodulator 10 generally includes time division demodulation and frequency division demodulation. In this case, the plurality of reading signal lines 200 can all be connected to one demodulator 10, and a time division demodulation can be adapted. A plurality of band demodulators 10 can also be used to simultaneously demodulate a plurality of electrical signals of different frequencies on one of the n reading signal lines 200. Based on this, each of the demodulators 10 can be connected to the plurality of reading signal lines 200 via a switcher, and demodulates the electrical signals of different frequencies on different reading signal lines 200 of the n reading signal lines 200 through switching of the switcher at different periods of time. Alternatively, each of the n reading signal lines 200 can be connected to a plurality of demodulators 10 to perform a time division/frequency division demodulation on the electrical signals. Of course, the arrangement of the demodulators 10 is not limited in the present disclosure, so long as the electrical signals of different frequencies on each of the n reading signal lines 200 can be demodulated according to the actual needs.

To sum up, since each of the plurality of electrode signal controllers 20 is connected to at least two driving signal lines 100, and each of the m driving signal lines 100 is connected to one row of photosensitive devices 300 in the m*n photosensitive devices 300, when a certain electrode signal controller 20 of the plurality of electrode signal controllers 20 is driven, this electrode signal controller 20 can input driving signals of different frequencies to each of the driving signal lines 100 in the m driving signal lines 100 connected to this electrode signal controller 20. That is, driving signals of different frequencies are input to each row of photosensitive devices 300 in the m*n photosensitive devices 300 correspondingly connected to each of the m driving signal lines, and a same column of photosensitive devices 300 in the m*n photosensitive devices 300 are connected to a same reading signal line 200 of the n reading signal lines 200, and electrical signals of different frequencies received by the same column of photosensitive devices 300 in the m*n photosensitive devices 300 can be demodulated through the corresponding demodulator 10 connected to the n reading signal lines 200. In this way, a plurality of rows of driving signal lines 100 in the m driving signal lines 100 can be driven simultaneously in each time period for fingerprint detection by sequentially driving each of the plurality of electrode signal controllers 20 in different time periods, thereby solving the problem of a long fingerprint detection time caused by driving the driving signal lines 100 in the m driving signal lines 100 row by row.

Further, in order that the m driving signal lines in the fingerprint recognition apparatus can be driven uniformly in groups, optionally, the number of the driving signal lines 100 in the m driving signal lines 100 driven by each of the plurality of electrode signal controllers 20 is the same. That is, each of the plurality of electrode signal controllers 20 simultaneously inputs the driving signals of different frequencies to m/S driving signal lines 100 of m driving signal lines 100 connected to each of the plurality of electrode signal controllers 100. Wherein, S is the number of the plurality of electrode signal controllers 20.

Figure 5:
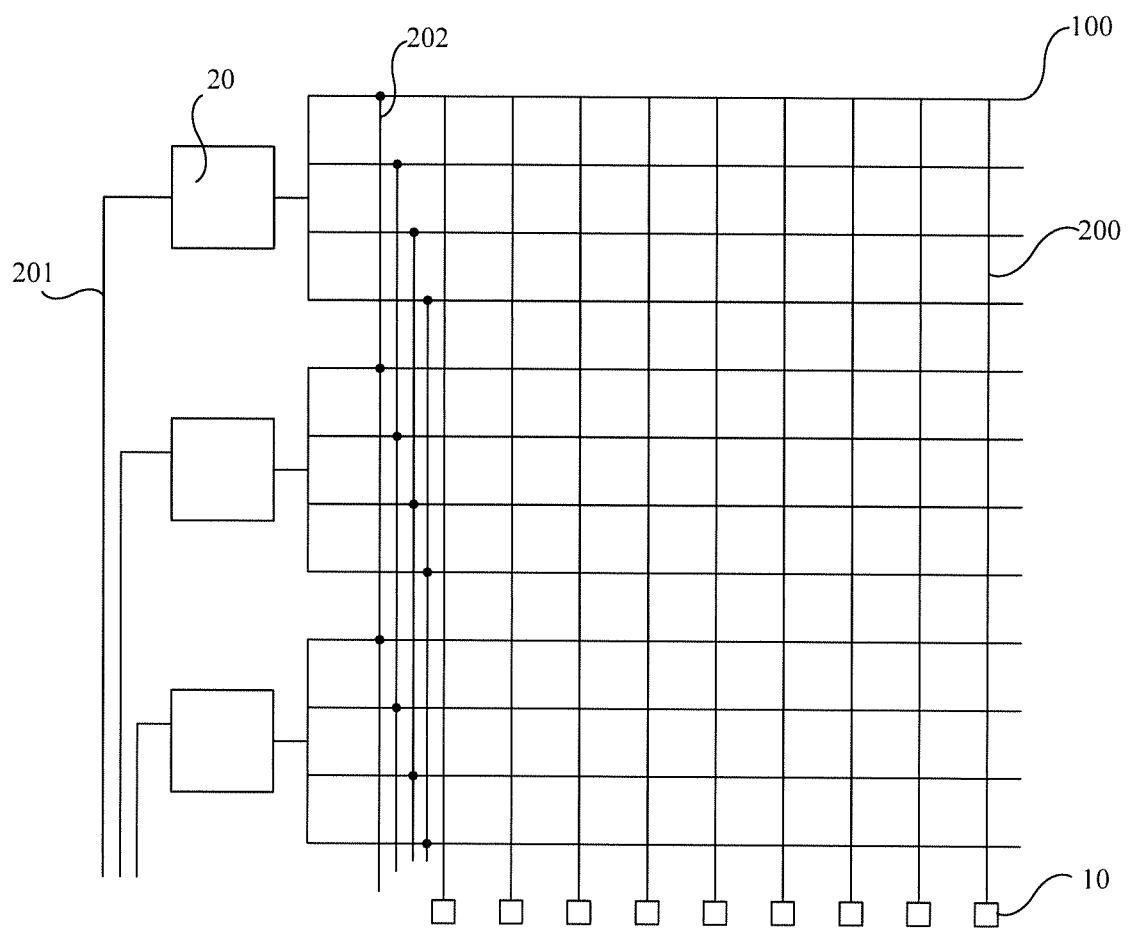
FIG. 5 is a schematic structural diagram of still another fingerprint recognition apparatus according to embodiments of the present disclosure.

In this case, as shown in FIG. 5, the fingerprint recognition apparatus can include S signal control lines 201 and m/S signal input lines 202, wherein each of the m/S signal input lines 202 is configured to input driving signals of different frequencies. Each of the plurality of electrode signal controllers 20 is connected to one of the S signal control lines 201, the m/S signal input lines 202 and the m/S driving signal lines 100 of the m driving signal lines 100. Each of the plurality of electrode signal controllers 20 is configured to output driving signals input by each of the m/S signal input lines 202 to each of the m/S driving signal lines 100 in the m driving signal lines in a manner of one-to-one correspondence under control of one of the S signal control lines.

The fingerprint recognition apparatus shown in FIG. 5 is taken as an example. The fingerprint recognition apparatus includes 12 driving signal lines 100 (m=12), and 3 electrode signal controllers 20 (S=3). Each of the 3 electrode signal controllers 20 is connected to one signal control line 201, 4 (m/S) signal input lines 202 and 4 (m/S) driving signal lines 100 of the 12 driving signal lines 100. In this case, the 4 signal input lines 202 input driving signals of different frequencies to the 4 driving signal lines 100 of the 12 driving signal lines 100 connected to each of the 3 electrode signal controllers 20, respectively.

Figure 6:
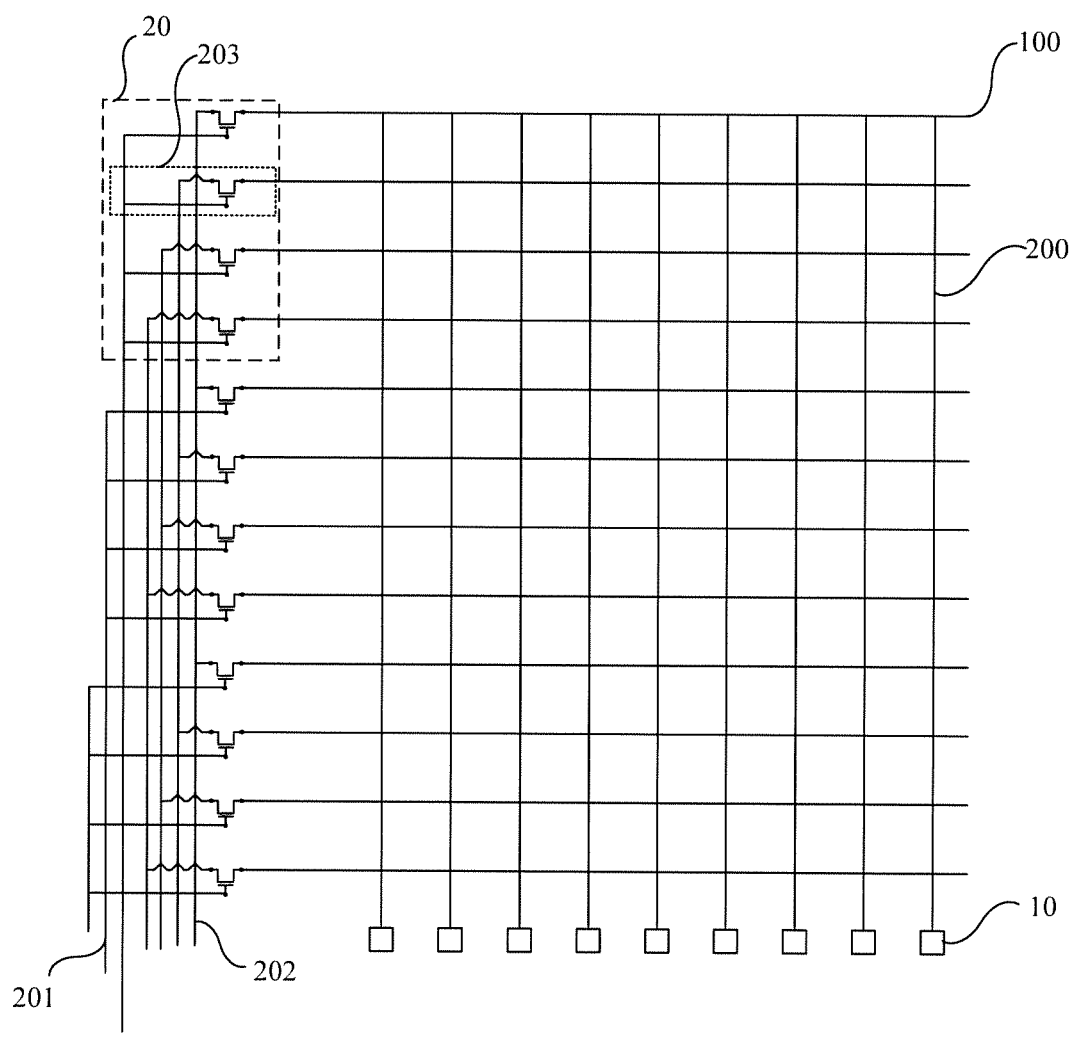
FIG. 6 is a schematic structural diagram of yet still another fingerprint recognition apparatus according to embodiments of the present disclosure.

Still further, each of the plurality of electrode signal controllers 20 can be connected to one signal control line 201, m/S signal input lines and m/S driving signal lines 100 of the m driving signal lines 100. For example, as shown in FIG. 6, each of the plurality of electrode signal controllers 20 includes m/S sub-controllers 203. The m/S sub-controllers 203 are all connected to a same signal control line 201 of the S signal control lines, are connected to the m/S signal input lines 202 in a manner of one-to-one correspondence, and are connected to the m/S driving signal lines 100 of the m driving signal lines 100 in a manner of one-to-one correspondence. The m/S sub-controllers 203 are configured to output driving signals input by the m/S signal input lines 202 to the m/S driving signal lines 100 of the m driving signal lines 100 under control of the same signal control line 201.

The fingerprint recognition apparatus shown in FIG. 6 is taken as an example. The fingerprint recognition apparatus includes 12 driving signal lines 100 (m=12), and 3 electrode signal controllers 20 (S=3). Each of the 3 electrode signal controllers 20 includes 4 (m/S) sub-controllers 203, the 4 (m/S) sub-controllers 203 are all connected to a same signal control line 201, the 4 (m/S) signal input lines 202 in a manner of one-to-one correspondence, and the 4 (m/S) driving signal lines 100 of the 12 driving signal lines 100 in a manner of one-to-one correspondence.

In addition, the m/S sub-controllers 203 can output the driving signals input by the m/S signal input lines 202 to the m/S driving signal lines 100 of the m driving signal lines under control of the same signal control line 201. As shown in FIG. 6, each of the m/S sub-controllers 203 can be a thin film transistor (TFT). A gate electrode of the TFT is connected to one of the S signal control lines 201, a source electrode of the TFT is connected to one of the m/S signal input lines 202, and a drain electrode of the TFT is connected to one of m/S driving signal lines 100 in the m driving signal lines 100.

Figure 7:
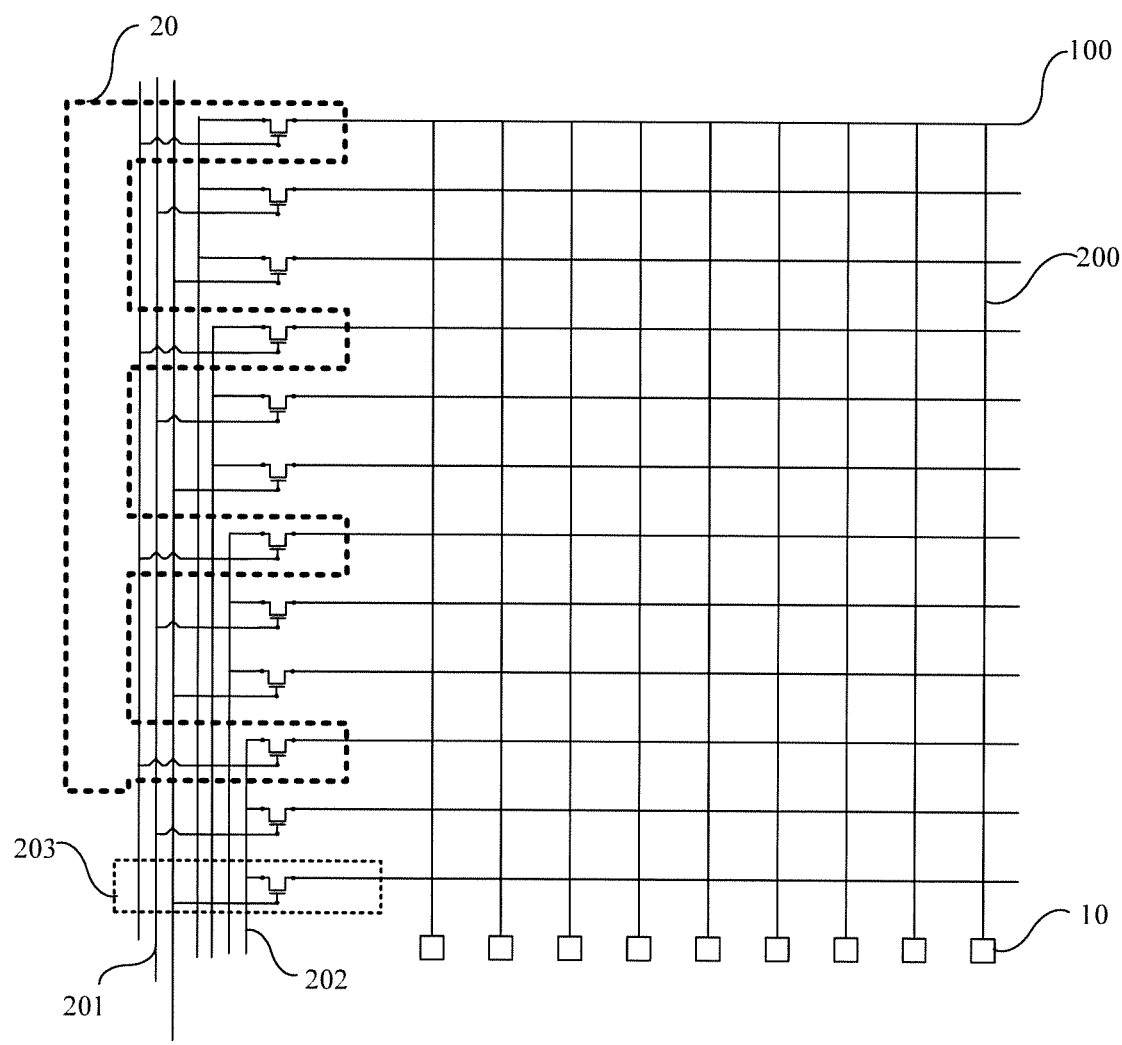
FIG. 7 is a schematic structural diagram of yet still another fingerprint recognition apparatus according to embodiments of the present disclosure.

Based on this, in order to drive the m drive signal lines in the entire fingerprint recognition apparatus in groups in a further uniformly dispersing manner, exemplarily, as shown in FIG. 7, in the m/S driving signal lines 100 of the m driving signal lines 100 connected to a same electrode signal controller 20 of the plurality of electrode signal controllers 20, S-1 driving signal lines 100 of the m/S driving signal lines 100 are arranged between every two adjacent driving signal lines 100. The fingerprint recognition apparatus shown in FIG. 7 is taken as an example. The fingerprint recognition apparatus includes 12 driving signal lines 100 (m=12), and 3 electrode signal controllers 20 (S=3). The first, fourth, seventh and tenth driving signal lines 100 in the 12 driving signal lines 100 are connected to one of the 3 electrode signal controllers 20, so as to be driven at same time. The second, fifth, eighth and eleventh driving signal lines 100 of the 12 driving signal lines 100 are connected to one of the 3 electrode signal controllers 20, so as to be driven at same time. The third, sixth, ninth and twelfth driving signal lines 100 of the 12 driving signal lines 100 are connected to one of the 3 electrode signal controllers 20, so as to be driven at same time.

and/or, the S sub-controllers 203 of the plurality of electrode signal controllers 203 connected to adjacent S driving signal lines 100 of the m driving signal lines 100 are connected to a same signal input line 202 of the m/S signal input lines 202. The fingerprint recognition apparatus shown in FIG. 7 is taken as an example. The fingerprint recognition apparatus includes 12 driving signal lines 100 (m=12), and 3 electrode signal controllers 20 (S=3). The 3 sub-controllers 203 of the 3 electrode signal controllers 20 connected to the first, second and third driving signal lines 100 of the 12 driving signal lines 100 are connected to a same signal input line 202 of the 4 signal input lines 202. The 3 sub-controllers 203 of the 3 electrode signal controllers 20 connected to the fourth, fifth and sixth driving signal lines 100 of the 12 driving signal lines 100 are connected to a same signal input line 202 of the 4 signal input lines 202. The 3 sub-controllers 203 of the 3 electrode signal controllers 20 connected to the seventh, eighth and ninth driving signal lines 100 of the 12 driving signal lines 100 are connected to a same signal input line 202 of the 4 signal input lines 202. The 3 sub-controllers 203 of the 3 electrode signal controllers 20 connected to the tenth, eleventh and twelfth driving signal lines 100 of the 12 driving signal lines 100 are connected to a same signal input line 202 of the 4 signal input lines 202.

Embodiments of the present disclosure further provide a display apparatus; the display apparatus includes any one of the fingerprint recognition apparatus above, and has the same structure and beneficial effect as the fingerprint recognition apparatus provided in the aforementioned embodiments. Since the structures and beneficial effects of the fingerprint recognition apparatus have been illustrated in detail in the above embodiments, they will not be elaborated here.

It should be noted that, the fingerprint recognition apparatus in the aforementioned display apparatus can be a structure provided separately from the display panel. For example, the fingerprint recognition apparatus is attached to the display panel for displaying and fingerprint detection. The fingerprint recognition apparatus can also be a structure integrated with the display panel.

Figure 8:
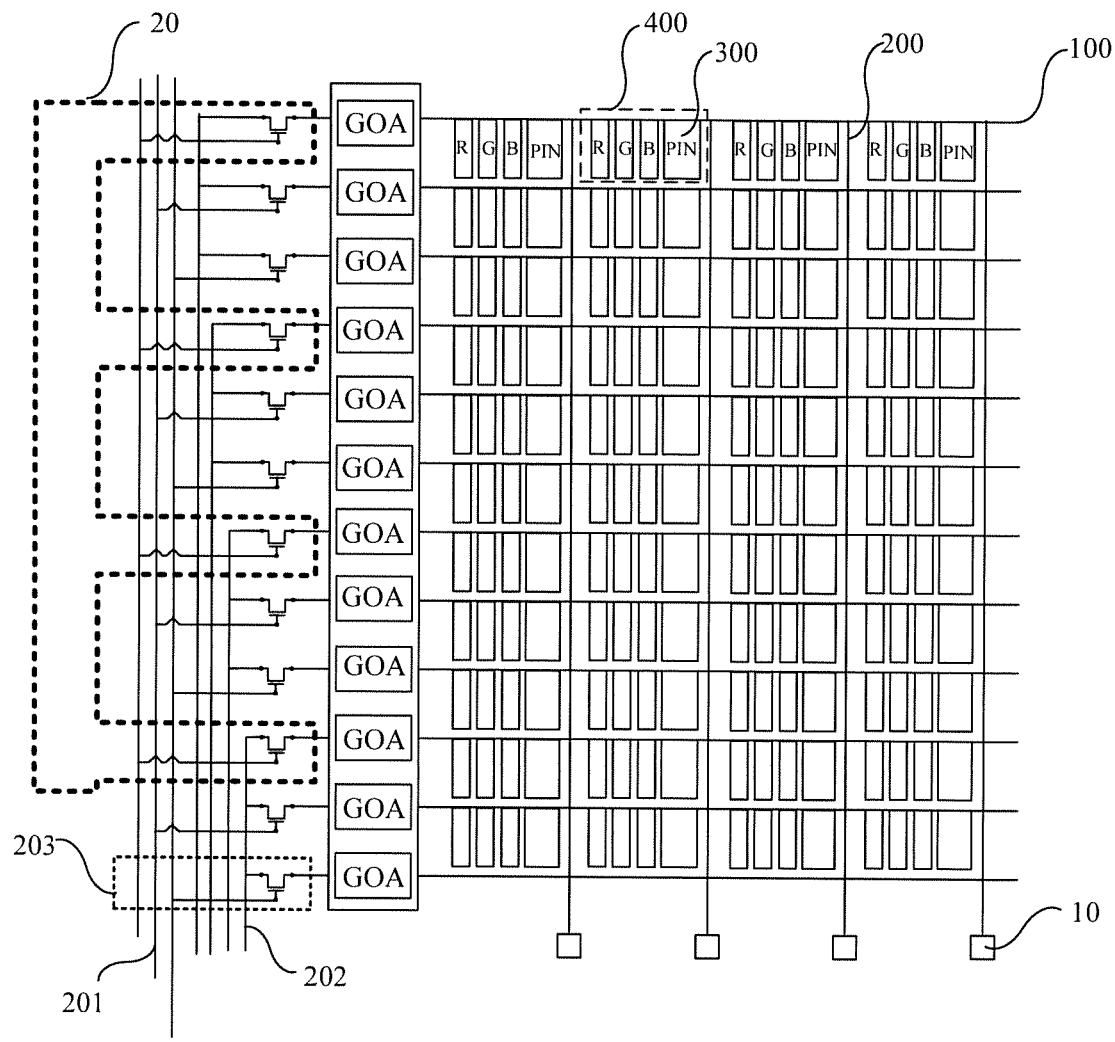
FIG. 8 is a schematic structural diagram of a display apparatus according to embodiments of the present disclosure.

The aforementioned display apparatus is an organic light emitting display (OLED) apparatus. As shown in FIG. 8, the display apparatus is divided into a plurality of pixel units 400, and each of the plurality of pixel units 400 includes a first primary color sub-pixel, a second primary color sub-pixel, a third primary color sub-pixel and a photosensitive device 300. The first primary color sub-pixel can be a red sub-pixel (R), the second primary color sub-pixel can be a green sub-pixel (G), and the third primary color sub-pixel can be a blue sub-pixel (B).

Based on this, the OLED display apparatus further includes a light-emitting control shift register circuit, i.e. an EM GOA circuit. The EM GOA circuit includes a plurality of light-emitting control shift register units shown in FIG. 9a, i.e. EM GOA units.

Figure 9A:
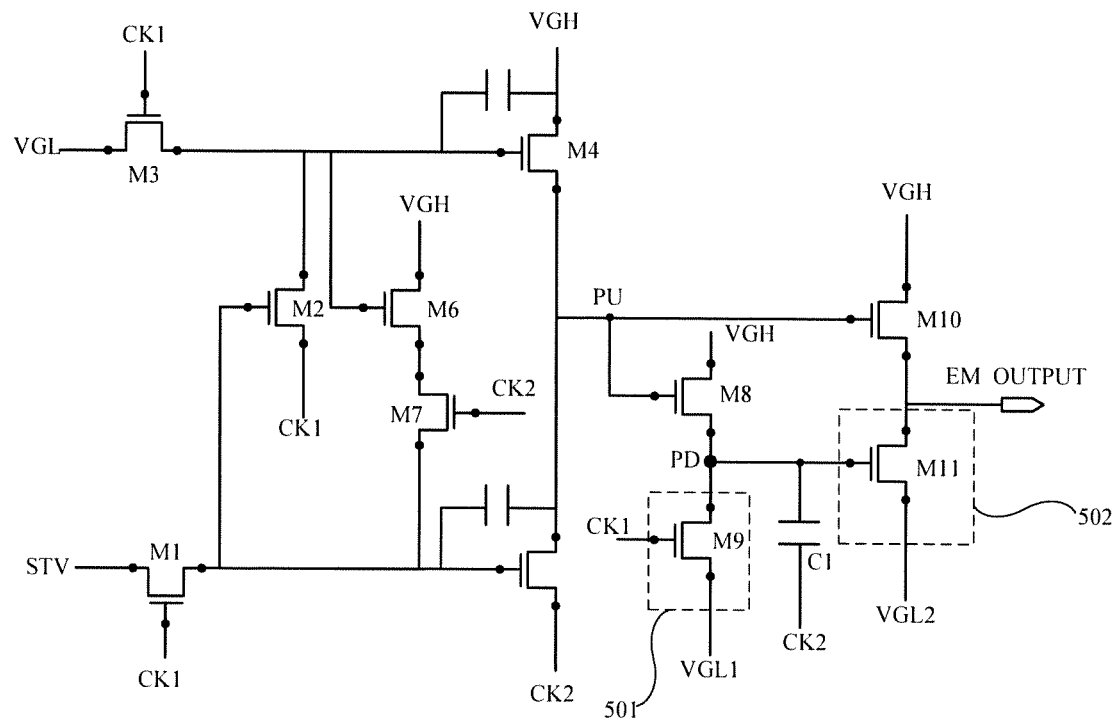
FIG. 9a is a circuit diagram of an EM GOA unit according to embodiments of the present disclosure.

As shown in FIG. 9a, the EM GOA unit includes a pull-down controller 501 and a pull-down device 502. The pull-down controller 501 is connected to a clock signal input end CK1, a pull-down node PD and a first low level input end VGL1. The pull-down controller 501 is configured to transmit a signal of the first low level input end VGL1 to the pull-down node PD under control of the input end of the clock signal CK1. The pull-down device 502 is connected to the pull-down node PD, a second low level input end VGL2 and a light-emitting control signal output end EM OUTPUT. The pull-down device 502 is configured to transmit a signal of the second low level input end VGL2 to the light-emitting control signal output end EM OUTPUT under control of the pull-down node PD.

Furthermore, the light-emitting control signal output end EM OUTPUT is connected to a driving signal line 100, and the driving signal line 100 shares a line with a light-emitting control line (EM line) of a pixel circuit in a same row of sub-pixels. The EM line is a signal line connected to a gate electrode end of the light-emitting control thin film transistor T6 of the pixel circuit (as shown in FIG. 10) connected to the same row of sub-pixels; the sub-controller 203 is connected to the second low level input end VGL2, and the sub-controller 203 is configured to output a driving signal input by the signal input line 202 to the driving signal line 100 via the second low level input end VGL2.

In the embodiments according to the present disclosure, in the OLED display apparatus, the light-emitting control signal output end EM OUTPUT of the EM GOA unit is connected to the EM line of the pixel circuit in the same row of sub-pixels, and the EM line and the driving signal line 100 are provided as a same signal line. In this case, during the display phase, normal display is ensured by the GOA unit and the pixel circuit (referring to FIG. 8, at this time, signal control lines 201 are all switched on, and signal input lines 202 all input low level signals). During the fingerprint acquisition phase, when a certain signal control line 201 is driven, driving signals of different frequencies are output to the light-emitting control signal output end EM OUTPUT through the second low level input end VGL2 of the GOA unit by means of the signal input line 202, and the driving signals are output to the driving signal line 100 (EM line) via the light-emitting control signal output end EM OUTPUT.

The EM line and the driving signal line 100 can be provided as a same signal line in some embodiments of the present disclosure, thereby achieving the object of simplifying the process.

Figure 10:
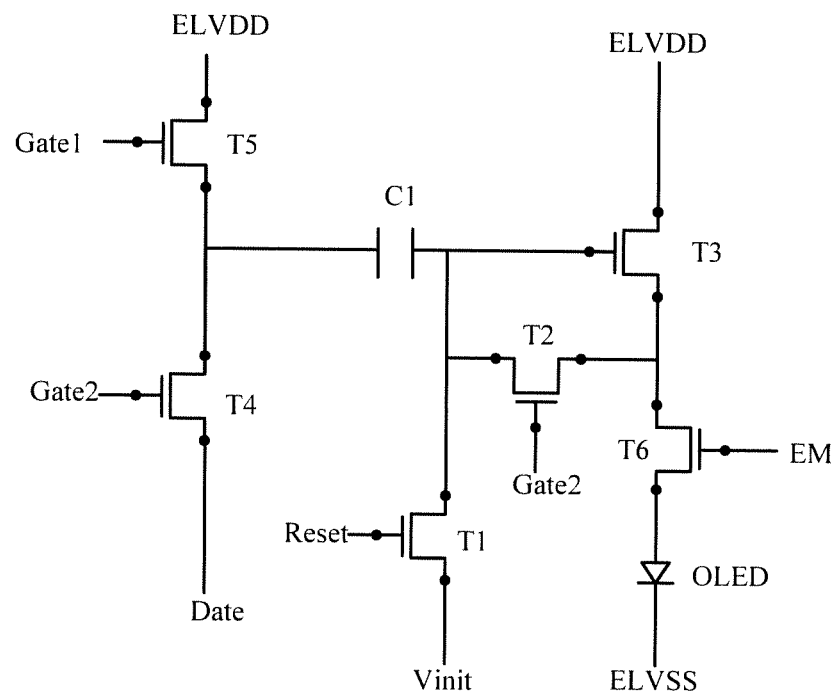
FIG. 10 is a pixel circuit diagram according to embodiments of the present disclosure.

Applications of the EM GOA unit in FIG. 9a and the pixel circuit in FIG. 10 will be briefly described through some examples. The following examples are described for the example that all the transistors are P-type transistors.

The working phase of the pixel circuit in FIG. 10 can generally be divided into a reset phase, a charging phase, a compensation phase, and a light-emitting phase.

In the reset phase, the reset signal end Reset is at a low level, a thin film transistor T1 is switched on, an initial voltage input by an initial voltage end Vinit is input to a thin film transistor T3, and the thin film transistor T3 is reset to 0, and is switched off.

In the charging phase, the second scanning signal end Gate2 is at a low level, thin film transistors T4 and T2 are switched on, and a date signal of a data signal end Date is input to a left end of a capacitor C1. The voltage of the right end of the capacitor C1 decreases to Vdate under the driving of the left end. The thin film transistor T3 is switched on, and a high level signal Vdd of the high level voltage end ELVDD is input and then passes through the thin film transistor T3, after that the voltage of the right end of the capacitor C1 is enabled to be Vdd−Vth, wherein the Vth is a threshold voltage of the thin film transistor T3.

In the compensation phase, all the signals are at the high level except that a first scanning signal end Gate1 is at a low level, a thin film transistor T5 is switched on, and all the remaining thin film transistors are switched off. At this time, the voltage of the left end of the capacitor C1 becomes a high level signal Vdd suddenly, and the voltage of the right end of the capacitor C1 becomes 2Vdd−Vdata−Vth.

In the light-emitting phase, the light-emitting control end EM is at a low level (the signal of the light-emitting control end EM is input by the light-emitting control signal output end EM OUTPUT of the GOA unit in FIG. 9a), and the OLED starts to emit light. At this time, the current passing through the OLED is $I_{OLED}=(K/2)(V_{gs}-V_{th})^2=(K/2)[Vdd-(2Vdd-Vdate-Vth)-Vth]^2=(K/2)(Vdate-Vdd)^2$. It can be seen that the threshold voltage Vth of he thin film transistor T3 is eliminated, so that the OLED can emit light steadily.

It should be noted that the scanning signal ends Gate1, Gate2 and the reset signal end Reset in the pixel circuit can be controlled by a driving IC, and can also be controlled by a Gate-Reset GOA, which is not limited in the present disclosure.

In the present disclosure, the EM GOA unit in FIG. 9a controls on/off of the OLED in the display phase, and inputs driving signals of different frequencies simultaneously through the electrode signal controller 20 to each of the driving signal lines connected to the electrode signal controllers 20 in the fingerprint acquisition phase.

Figure 9B:
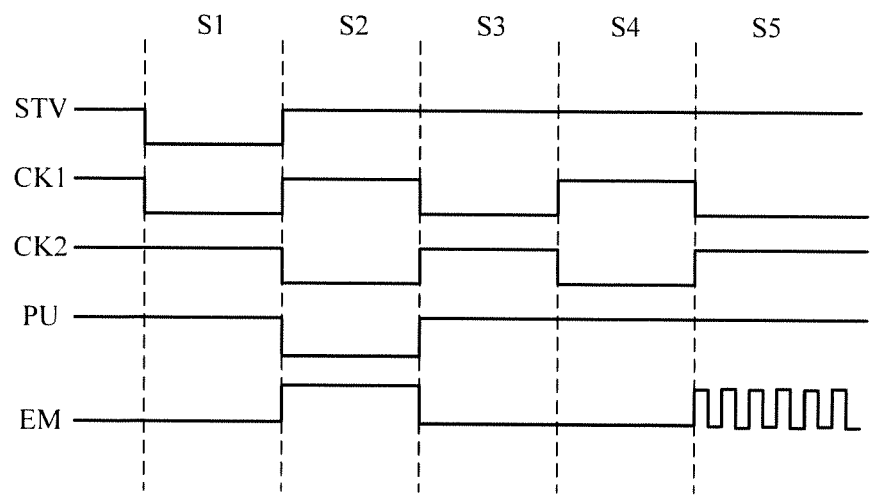

Exemplarily, the five working phases of the EM GOA unit are described briefly below with reference to the EM GOA unit in FIG. 9a and a timing signal diagram in FIG. 9b.

A first phase S1: a pull-up node PU is at a high level and a thin film transistor M10 is switched off under control of a start signal end STV, a first clock signal end CK1 and a second clock signal end CK2. A thin film transistor M9 is switched on under control of the first clock signal end CK1 to output a low level of the first low level input end VGL1 to a thin film transistor M11, the thin film transistor M11 is switched on to output a low level of the second low level input end VGL2 to the light-emitting control signal output end EM OUTPUT.

A second phase S2: the pull-up node PU is at a low level and the thin film transistor M10 is switched on under control of the start signal end STV, the first clock signal end CK1 and the second clock signal end CK2 to output a high level of the high level input end VGH to the light-emitting control signal output end EM OUTPUT.

A third phase S3: it is the same as the first phase S1, wherein the pull-up node PU is at a high level, the thin film transistor M10 is switched off, and the thin film transistor M11 is switched on, and a low level of the second low level input end VGL2 is output to the light-emitting control signal output end EM OUTPUT.

A fourth phase S4: the thin film transistor M11 is switched on under control of the second clock signal end CK2 and the capacitor C1 to output a low level of the second low level input end VGL2 to the light-emitting control signal output end EM OUTPUT.

That is, the light-emitting control signal output end EM OUTPUT outputs a low level in both the third phase S3 and the fourth phase S4, so the luminescence duration of the OLED can be controlled by controlling the cycles of the third phase S3 and the fourth phase S4 in practical application.

A fifth phase S5: this phase is corresponding to the fingerprint acquisition phase, and is the same as the first phase S1, wherein the pull-up node PU is at a high level and the thin film transistor M10 is switched off. A thin film transistor M9 is switched on to output a low level of the first low level input end VGL1 to the thin film transistor M11 under control of the first clock signal end CK1, and then the thin film transistor M11 is switched on. At this time, driving signals of different frequencies are input to the second low level input end VGL2 via the signal input line 202, and then the driving signals are output to the driving signal lines 100 via the light-emitting control signal output end EM OUTPUT, thereby meeting the demand for driving signals in the fingerprint detection phase.

Some embodiments of the present disclosure further provide a method for reading signals of a fingerprint recognition apparatus. As shown in FIGS. 2 and 3, the fingerprint recognition apparatus includes m driving signal lines 100, n reading signal lines 200 and m*n photosensitive devices 300, the m driving signal lines 100 and the n reading signal lines 200 are arranged crosswise, and the m*n photosensitive devices 300 are arranged in a matrix form, m and n both being positive integers. First electrodes 301 of a same row of photosensitive devices 300 in the m*n photosensitive devices 300 are connected to a same driving signal line 100 of the m driving signal lines 100. The m driving signal lines 100 are configured to input a first driving signal to the m*n photosensitive devices 300. First electrodes 301 of different rows of photosensitive devices 300 in the m*n photosensitive devices 300 are connected to different driving signal lines 100. First electrodes 301 of a same column of photosensitive devices 300 in the m*n photosensitive devices 300 are connected to a same reading signal line 200 of the n reading signal lines 200. First electrodes 301 of different columns of photosensitive devices 300 in the m*n photosensitive devices 300 are connected to different reading signal lines 200 of the n reading signal lines 200. The second electrode is configured to input a second driving signal. The fingerprint recognition apparatus further includes a demodulator 10 connected to the n reading signal lines 200, the demodulator 10 is configured to demodulate electrical signals of different frequencies transmitted on each of the n reading signal lines 200.

The method for reading signals includes:

S101: driving signals are input to different signal line groups at different time periods, including: inputting driving signals of different frequencies to each of driving signal lines 100 in a signal line group within a time period, one signal line group including at least two driving signal lines from the m driving signal lines 100.

S102: signals on each of the n reading signal lines 200 in each time period are demodulated to obtain electrical signals of different frequencies transmitted on each of the n reading signal lines 200.

To sum up, since one signal line group includes at least two of the m driving signal lines 100, and each of them driving signal lines 100 is connected to a row of photosensitive devices 300 of the m*n photosensitive devices 300, when driving signals are input to a signal line group within a period of time, driving signals of different frequencies are input to each of the driving signal lines 100 in the signal line group, that is, driving signals of different frequencies are input to each row of photosensitive devices 300 correspondingly connected to each of the driving signal lines 100 in the signal line group; and a same column of photosensitive devices 300 in the rows of photosensitive devices 300 in the m*n photosensitive devices 300 are connected to one of the n reading signal lines 200, and electrical signals of different frequencies of the same column of photosensitive devices 300 in the m*n photosensitive devices 300 can be demodulated by the demodulator 10 connected to one of the n reading signal lines 200. In this way, a plurality of rows of driving signal lines 100 in the m driving signal lines 100 can be driven simultaneously in each time period for fingerprint detection by sequentially driving each of the signal line groups in different time periods, thereby solving the problem of a long fingerprint detection time caused by driving the driving signal lines 100 in the m driving signal lines 100 row by row.

A person of ordinary skill in the art can understand that all or part of the steps for implementing the embodiments in the above method can be completed by using hardware related to program instructions. The foregoing program may be stored in a computer readable storage medium, and when the program is executed, the steps including the embodiments of the above method are executed. The foregoing storage medium includes various media that can store program codes, such as ROM, RAM, disk and optical disk.

The above embodiments are merely specific embodiments of the present disclosure, but the protection scope of the present disclosure is not limited thereto. Any person skilled in the art could readily conceive of changes or replacement within the technical scope of the present disclosure, which should all be included in the protection scope of the present disclosure. Therefore, the protection scope of the present disclosure should be determined by the protection scope of the claims.

What is claimed is:

1. A fingerprint recognition apparatus, including: m driving signal lines, n reading signal lines and m*n photosensitive devices, wherein the m driving signal lines and the n reading signal lines are arranged crosswise, the m*n photosensitive devices are arranged in a matrix form, and each of the m*n photosensitive devices includes a first electrode and a second electrode, m and n both being positive integers and "m*n" referring to a product of m and n;

first electrodes of a same row of photosensitive devices in the m*n photosensitive devices are connected to a same driving signal line of the m driving signal lines, the m driving signal lines are configured to input a first driving signal to the m*n photosensitive devices, first electrodes of different rows of photosensitive devices in the m*n photosensitive devices are connected to different driving signal lines of the m driving signal lines; the second electrode is configured to input a second driving signal; first electrodes of a same column of photosensitive devices in the m*n photosensitive devices are connected to a same reading signal line of the n reading signal lines, and first electrodes of different columns of photosensitive devices in the m*n photosensitive devices are connected to different reading signal lines of the n reading signal lines;

the fingerprint recognition apparatus further including:

a plurality of electrode signal controllers, wherein each of the plurality of electrode signal controllers is connected to at least two of the m driving signal lines, different electrode signal controllers of the plurality of electrode signal controllers are connected to different driving signal lines of the m driving signal lines, the plurality of electrode signal controllers are configured to simultaneously input driving signals of different frequencies to each driving signal line connected to the plurality of electrode signal controllers, different electrode signal controllers of the plurality of electrode signal controllers are configured to input driving signals to the m driving signal lines at different time periods;
a demodulator, wherein the demodulator is connected to the n reading signal lines, and is configured to demodulate electrical signals of different frequencies transmitted on each of the n reading signal lines when the plurality of electrode signal controllers drive each row of photosensitive devices in the m*n photosensitive devices connected to the plurality of electrode signal controllers,
wherein a number of the demodulator is more than one;
each of the n reading signal lines is connected to one of demodulators;
or each of the n reading signal lines is connected to at least two of demodulators;
or each of a plurality of demodulators is connected to each of the n reading signal lines via a switcher.

2. The fingerprint recognition apparatus according to claim 1, wherein the plurality of electrode signal controllers includes S electrode signal controllers, and the fingerprint recognition apparatus further comprises S signal control lines and m/S signal input lines, and each of the m/S signal input lines is configured to input driving signals of different frequencies, S being an positive integer and "m/S" referring to a quotient of m divided by S;
each of the plurality of electrode signal controllers is connected to one of the S signal control lines, the m/S signal input lines and m/S driving signal lines of the m driving signal lines, and each of the plurality of electrode signal controllers is configured to output driving signals input by each of the m/S signal input lines to each of the m/S driving signal lines of the m driving signal lines in a manner of one-to-one correspondence under control of one of the S signal control lines.

3. The fingerprint recognition apparatus according to claim 2, wherein each of the plurality of electrode signal controllers includes m/S sub-controllers, the m/S sub-controllers are all connected to a same signal control line of the S signal control lines, and to the m/S signal input lines in a manner of one-to-one correspondence, and are connected to the m/S driving signal lines of the m driving signal lines in a manner of one-to-one correspondence;
the m/S sub-controllers are configured to output driving signals input by the m/S signal input lines to the m/S driving signal lines of the m driving signal lines under control of the S signal control lines.

4. The fingerprint recognition apparatus according to claim 3, wherein each of the m/S sub-controllers is a thin film transistor, a gate electrode of the thin film transistor is connected to one of the S signal control lines, a source electrode of the thin film transistor is connected to one of the m/S signal input lines, and a drain electrode of the thin film transistor is connected to one of the m/S driving signal lines of the m driving signal lines.

5. The fingerprint recognition apparatus according to claim 2, wherein,
S-1 driving signal lines of the m/S driving signal lines are arranged between every two adjacent driving signal lines within the m/S driving signal lines which are connected to a same electrode signal controller of the plurality of electrode signal controllers, and "S-1" referring to a difference of S minus 1;
or S sub-controllers of the plurality of electrode signal controllers connected to adjacent S driving signal lines of the m driving signal lines are connected to a same signal input line of the m/S signal input lines.

6. The fingerprint recognition apparatus according to claim 1, wherein second electrodes of the m*n photosensitive devices are connected together.

7. A display apparatus including the fingerprint recognition apparatus according to claim 1.

8. The display apparatus according to claim 7, wherein the display apparatus is an organic light emitting display apparatus, and is divided into a plurality of pixel units, and each of the plurality of pixel units includes a first primary color sub-pixel, a second primary color sub-pixel, a third primary color sub-pixel and a photosensitive device.

9. The display apparatus according to claim 8, wherein the display apparatus further includes a light-emitting control shift register circuit, the light-emitting control shift register circuit includes a plurality of light-emitting control shift register units, and each of the plurality of light-emitting control shift register units includes a pull-down controller and a pull-down device;
the pull-down controller is connected to a clock signal input end, a pull-down node and a first low level input end, and is configured to transmit a signal of the first low level input end to the pull-down node under control of the clock signal input end;
the pull-down device is connected to the pull-down node, a second low level input end and a light-emitting control signal output end, and is configured to transmit a signal of the second low level input end to the light-emitting control signal output end under control of the pull-down node;
the light-emitting control signal output end is connected to a driving signal line, the driving signal line shares a same line with a light-emitting control line of a same row of sub-pixels, and a sub-controller is connected to the second low level input end, and outputs a driving signal input by a signal input line to the driving signal line via the second low level input end.

10. A method for reading signals of a fingerprint recognition apparatus, wherein the fingerprint recognition apparatus comprises m driving signal lines, n reading signal lines and m*n photosensitive devices, the m driving signal lines and the n reading signal lines are arranged crosswise, the m*n photosensitive devices are arranged in a matrix form, and each of the m*n photosensitive devices comprises a first electrode and a second electrode, m and n both being positive integers and "m*n" referring to a product of m and n;
first electrodes of a same row of photosensitive devices in the m*n photosensitive devices are connected to a same driving signal line of the m driving signal lines, the m driving signal lines are configured to input a first driving signal to the m*n photosensitive devices, first electrodes of different rows of photosensitive devices in the m*n photosensitive devices are connected to different driving signal lines of the m driving signal lines, the second electrode is configured to input a second driving signal, first electrodes of a same column of photosensitive devices in the m*n photosensitive devices are connected to a same reading signal line of the n reading signal lines, and first electrodes of different columns of photosensitive devices in the m*n photosensitive devices are connected to different reading signal lines of the n reading signal lines;
the fingerprint recognition apparatus further comprises a demodulator connected to the n reading signal lines, a number of the demodulator is more than one, each of the n reading signal lines is connected to one of demodulators, or each of the n reading signal lines is connected to at least two of demodulators, or each of a plurality of demodulators is connected to each of the n reading signal lines via a switcher, and the demodulator is configured to demodulate electrical signals of different frequencies transmitted on each of the n reading signal lines;

the method for reading signals includes:

inputting driving signals to different signal line groups at different time periods, including:

inputting driving signals of different frequencies to each driving signal line in a signal line group within a time period, wherein the signal line group includes at least two of the m driving signal lines;

demodulating signals on each of the n reading signal lines within each of the time periods to obtain electrical signals of different frequencies transmitted on each of the n reading signal lines.

* * * * *